United States Patent [19]

Allison

[11] Patent Number: 4,766,959
[45] Date of Patent: Aug. 30, 1988

[54] REDUCING PERMEABILITY OF HIGHLY PERMEABLE ZONES IN SUBTERRANEAN FORMATIONS

[75] Inventor: Joe D. Allison, Ponca City, Okla.

[73] Assignee: Conoco Inc., Ponca City, Okla.

[21] Appl. No.: 37,494

[22] Filed: Apr. 13, 1987

[51] Int. Cl.$^4$ ..................... E21B 33/138; E21B 43/22
[52] U.S. Cl. ..................................... 166/295; 106/208; 166/274; 166/294; 252/8.551; 252/315.3; 523/130
[58] Field of Search ............... 252/8.512, 8.551, 315.3; 166/308, 294, 295; 106/208; 523/130

[56] References Cited

U.S. PATENT DOCUMENTS

| | | |
|---|---|---|
| 3,794,115 | 5/1984 | Skagerberg . |
| 3,800,872 | 6/1978 | Friedman . |
| 3,815,681 | 6/1984 | Richardson . |
| 3,974,077 | 8/1976 | Free ................................ 252/8.551 |
| 4,498,539 | 10/1986 | Bruning . |
| 4,514,309 | 4/1985 | Wadhwa ......................... 252/8.551 |
| 4,579,670 | 4/1986 | Payne .............................. 252/315.3 |
| 4,619,776 | 10/1986 | Mondshine ..................... 252/8.551 |

*Primary Examiner*—Herbert B. Guynn

[57] ABSTRACT

High permeability zones in a subterranean formation are reduced in permeability by the time-delayed gelation of water soluble polymers in such formation with alkoxy amine esters of boric acid which slowly hydrolyze. Boric acid resulting from the hydrolysis converts to the borate ion which crosslinks the polymers to form gels.

12 Claims, 1 Drawing Sheet

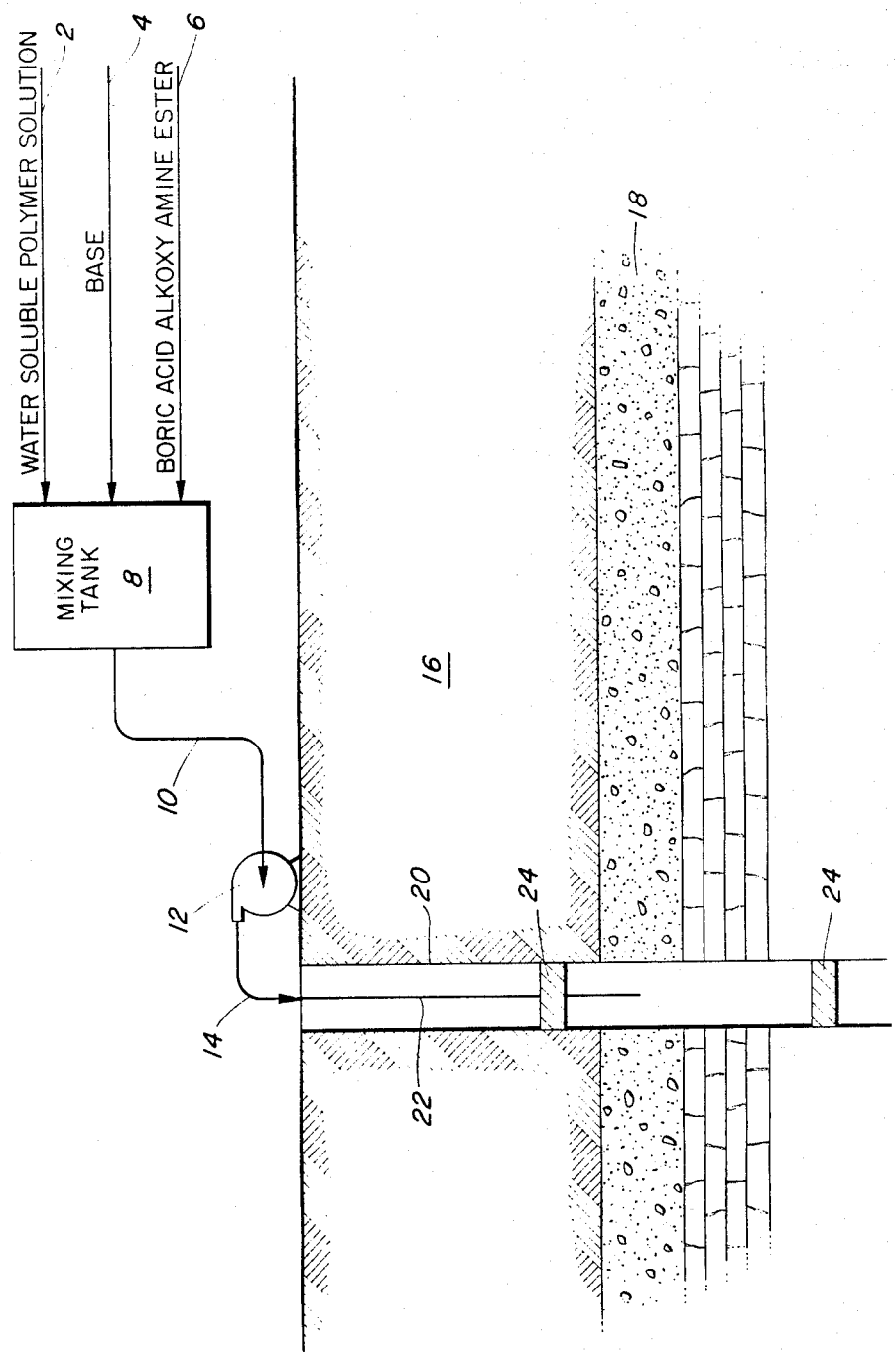

REDUCING PERMEABILITY OF HIGHLY PERMEABLE ZONES IN SUBTERRANEAN FORMATIONS

BACKGROUND AND SUMMARY OF THE INVENTION

The problem of fluid loss to highly porous underground formations penetrated by a well has, of course, been long recognized. These highly porous zones are often called thief zones. In water or steam stimulation operations, for example, a serious problem is often encountered because a very small interval of the total production zone may be taking 80 percent or more of the total injected fluid. When this happens, the benefit of the injection project may be lost or greatly reduced.

An isolated high-permeability zone or fracture can be plugged at the well bore face by a shallow layer of applied cement, though such a permanent relatively irrevocable technique often is undesirable. More desirably, a communicating high-permeability zone is plugged to some considerable depth in order to prevent flood water from otherwise merely flowing around a narrow shallow plug and back into the high-permeability or swept zone. Indepth plugging of a relatively high-permeability zone converts the zone into a much lower permeability zone. Then subsequently injecting flood water or other fluid will tend to enter the formerly by-passed but now relatively more permeable hydrocarbon-bearing zones and thus mobilize increased amounts of hydrocarbons therefrom.

Various methods have been used in the past to achieve indepth gelling, such as gelable systems triggered by a following aqueous acidic solution injection for subsequent pH adjustment. However, injecting an acidic solution following the polymer solution may result in gelatin occurring so rapidly that a sufficient indepth plugging is not effectively obtained in the most permeable strata where desired. In another method, water, a polymer and a crosslinking agent capable of gelling the polymer such as a sequestered polyvalent metal cation, are admixed, and, just before injection into an underground formation, an acid is added thereto to effect gelation. But, when the acid is pre-mixed with the gelable composition, the gelation can be too fast, making it necessary to shear the gelled polymer in order to be able to obtain adequate injection, which reduces effectiveness of the gel.

Indepth gelling has also been effected by the controlled gelation of sodium silicate. Also polymers have previously been gelled in permeable zones by borate ions supplied in various ways.

According to this invention the permeability of highly permeable zones in a subterranean formation is reduced by introducing to the formation an aqueous solution of a water soluble polymer which is crosslinked to form a gel by borate ions and an alkoxy amine ester of boric acid which hydrolyzes sufficiently slowly to allow the polymer and ester to penetrate the formation before boric acid is released and converted to borate ions which crosslink and gel the polymer.

PRIOR ART

U.S. Pat. No. 3,800,872 discloses that crosslinking of polyvinyl alcohol at pH above 8 by borate ions results in crosslinking and plugging of permeable zones.

U.S. Pat. No. 3,794,115 discloses that plugs of borate cross-linked polyvinyl alcohol can be formed deep in formations by supplying the borate from a borax glass which dissolves and releases the borate ion. The dissolving borax glass also imparts alkalinity.

BRIEF DESCRIPTION OF THE DRAWING

The drawing is a schematic flow diagram (partially in cross-section) of an apparatus arrangement which illustrates the method for carrying out the invention.

DETAILED DESCRIPTION OF THE INVENTION

Referring now to the drawing there is provided a mixing tank 8 in which a water soluble polymer, a base and a boric acid alkoxy amine ester are introduced via lines 2, 4, and 6 respectively. The mixture leaving tank 8 through line 10 is passed through pump 2 and line 14 into a well bore 20 penetrating an earth formation 16 and a streak or zone 18 of high permeability. Well 20 is preferably provided with packing means 24 to isolate zone 18. The mixture entering the well passes downwardly through tubing string 22 and enters formation 18. Within the formation the boric acid alkoxy amine ester slowly hydrolyzes, releasing boric acid. In the basic solution provided in the formation the boric acid is converted to the borate ion. This ion crosslinks the water soluble polymer to form a gel which substantially reduces the permeability of zone 18. Thus in a water flood operation where zone 18 has previously passed a major portion of the fluids injected into the formation these fluids are now forced into other zones (not shown) which contain oil thereby increasing the production of oil from the formation.

The polymers which are used in the practice of the invention are polygalactomannan gums, hydroxyalkyl ethers of polygalactomannan gums, carboxyalkyl ethers of polygalactomannan gums, their depolymerized counterparts, polyvinyl alcohol and mixtures thereof. The term "polygalactomannan" as used herein includes the general class of polysaccharides containing both galactose and mannose units. The "polygalactomannans" are usually found in the endosperm sections of leguminous seeds such as guar, locust bean, tara, honey bean, flame-tree and cassia occidentalis.

Hydroxyalkyl ethers of polygalactomannans refer to derivatives obtained by reacting a polygalactomannan with an alkylene oxide in the presence of an alkaline catalyst. The alkylene oxide forms an ether linkage with a hydroxyl group of the galactomannan unit.

Carboxyalkyl polygalactomannans are derivatives obtained by reacting polygalactomannan gum with halo aliphatic acid or salt of a halo aliphatic acid. Usually this is done by treating the polygalactomannan with aqueous solution of an alkali such as sodium hydroxide and then treating the alkali gum with a halo aliphatic acid or a halo aliphatic acid salt.

The depolymerized counterparts of the above polygalactomannan gums and their derivatives are made by treating the gum with a mixture of an alkali such as sodium hydroxide and hydrogen peroxide or alkali metal peroxide and heating the mixture to a temperature of about 60° to 90° C. as in making the carboxyalkyl or hydroxyalkyl derivatives. When making depolymerized carboxyalkyl or hydroxyalkyl ethers of polygalactomannan gums, the polygalactomannan gum can be first depolymerized and subsequently reacted with the halo aliphatic acid or the alkylene oxide.

Polyvinyl alcohol is a well-known polymer usually prepared by hydrolyzing polyvinyl acetate. The polyvinyl alcohols generally useful in the practice of this invention are those in which about 70% to 95% of the acetate groups have been hydrolyzed to hydroxyl groups. The preferred hydrolyzed range is about 80% to 90%. The molecular weight of the polyvinyl alcohol should generally produce viscosities of about 1 to 200 centipoise at a temperature of 25° C. in an aqueous dispersion containing 4% by weight polyvinyl alcohol.

The above described water soluble polymers are generally used in this invention in amounts of about 1% to 10% by weight based upon the weight of the polymer and water combination. The long chain polygalactomannan gums and their derivatives are preferably used in amounts of from about 1% to 3% by weight and their polymerized counterparts preferably in amounts of from about 2% to 4% by weight, both based on the weight of the gum-water combination. Polyvinyl alcohol is generally used in amounts of about 1% to 10% weight, based on the weight of the polymer-water combination and preferably in amounts of about 2% to about 10%.

Additional details concerning the preparation of the preceding polymers may be found in U.S. Pat. No. 3,794,115 which is hereby incorporated by reference.

The slowly hydrolyzable alkoxy amine esters of boric acid which are used in the composition and method of the invention are represented by the following formula:

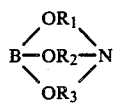

in which $R_1$, $R_2$ and $R_3$ are straight chain or branched alkylene groups having 2 to 5 carbon atoms and $R_1$, $R_2$ and $R_3$ may be the same or different. Specific examples of compounds which may be used are tripropanol amine borate, ethanol dipropanol amine borate, triisopropyl amine borate and diethanolbutanol amine borate.

The ester can be used in amounts from about 1 percent to about 200 percent by weight of the polymer, but preferably is employed in amounts between about 5 percent and about 10 percent by weight.

When the formation is not sufficiently basic to convert boric acid to the borate ion it is necessary to add a basic material to the system. When used the base ordinarily is an alkali metal hydroxide such as sodium hydroxide, potassium hydroxide or lithium hydroxide. Ammonium hydroxide, however, may also be used. In addition to the inorganic bases, it is also possible to employ strong organic bases, for example, ethyl amine, propylamine, or triethanol amine. Usually, because of cost and availability, it is preferred to use a caustic solution formed of sodium hydroxide or ammonium hydroxide.

The amount of base used, which normally is provided in concentrations between 10 and 50 percent in water, depends on the basicity of the formation. It usually varies from about 15 to about 50 percent by weight based on the polymer.

In the drawing the base is shown being added to the polymer and ester, however, it is within the scope of the invention to inject base into the formation prior to injection of the polymer and ester. In the alternative, polymer and ester may first be injected into the formation allowed by injection of the base. Also, if desired, the polymer and ester may be introduced separately to the formation.

The volume of material (polymer, ester and base) injected in the zone of high permeability to be treated is determined by the size of the zone. Typically volumes from about 5 to about 100 percent of the pore volume of the zone to be treated are used. Once the amount of material to be injected has been determined and the injection rate has been set, the treatment time can then be estimated. Polymer, ester and base are then selected to provide a material which is stable for the amount of time equal to the required treatment time.

The following examples illustrate the results obtained in carrying out the invention:

EXAMPLE 1

Various alkoxy amine esters of boric acid were added to a 3 percent solution of polyvinyl alcohol to which 0.5 ml. of 5 percent NaOH had previously been added. Each solution was observed to ascertain the time required for gelation. The results are shown in the following Table.

Table

| Boric Acid Ester | Chemical Formula | Gel Time |
| --- | --- | --- |
| Triethoxyborane | $B(OC_2H_5)_3$ | immediate |
| Triethanolamine borate | $B(OCH_2CH_2)_3N$ | 1.9 min |
| Diethanolpropanolamine borate | $B(OCH_2CH_2)_2(OC_3H_6)N$ | 3.0 min |
| Tripropanolamine borate | $B(OC_3H_6)_3N$ | 21.5 hr. |

It is apparent that alkoxy amine esters of boric acid can delay the gelation of polyvinyl alcohol.

EXAMPLE 2

In a waterflood of an oil-bearing formation salt water is injected for six months. At the end of this time the well is logged and it is found that 70 percent of the injection water is being lost into a thief zone.

Two thousand barrels of a mixture of an aqueous solution of guar gum, triisopropanol amine borate (10 wt%) and 5 percent sodium hydroxide (2 wt%) are introduced into the injection well over a period of 36 hours. Upon completion of the injection that portion of the mixture remaining in the well bore is displaced into the formation with fresh water.

Within two days after injection the ester hydrolyzes to form boric acid which is converted to the borate ion in the alkaline solution. The borate ions then crosslink and gel the guar gum polymer, thereby plugging the entire thief zone.

Upon logging the injection well a second time it is determined that the thief zone is now taking only 10 percent of the injection water. Thus the permeability of the thief zone is substantially reduced by the method and composition of the invention.

We claim:

1. A process for reducing the permeability of a subterranean formation traversed by a well bore which comprises:
   (a) introducing into the formation via the well bore an aqueous solution of a water soluble polymer selected from the group consisting of polygalactomannan gums, hydroxyalkyl ethers of polygalactomannan gums, carboxy alkyl ethers of polygalactomannan gums, their depolymerized counterparts, polyvinyl alcohol and mixtures thereof, said polymer being in said solution in an amount of from about 1% to 10% by weight of said solution; and (b) introducing into the formation via the well bore a slowly hydrolyzable alkoxy amine ester of boric acid having the formula

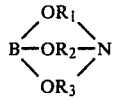

in which $R_1$, $R_2$ and $R_3$ are straight chain or branched alkylene groups having 2 to 5 carbon atoms and $R_1$, $R_2$ and $R_3$ may be the same or different, said ester being introduced in an amount of from about 1% to 200% by weight of said polymer, whereby said ester hydrolyzes to provide boric acid which is converted to borate ions at formation conditions, and whereby said borate ions cause crosslinking of said polymer to form a gel which reduces the permeability of said formation.

2. The process of claim 1 in which the water soluble polymer and the alkoxy amine ester of boric acid are separately introduced into the formation.

3. The process of claim 1 in which the water soluble polymer and the alkoxy amine ester of boric acid are combined prior to their introduction into the formation.

4. The process of claim 1 in which a base for converting boric acid to borate ions is also introduced into the formation.

5. A process for reducing flow into a thief zone penetrated by a water injection well bore which comprises:
(a) injecting down said well bore and into said thief zone an aqueous solution of a water soluble polymer selected from the group consisting of polygalactomannan gums, hydroxyalkyl ethers of polygalactomannan gums, carboxy alkyl ethers of polygalactomannan gums, their depolymerized counterparts, polyvinyl alcohol and mixtures thereof, said polymer being in said solution in an amount of from about 1% to 10% by weight of said solution; and
(b) injecting down said well bore and into said thief zone an alkoxy amine ester of boric acid having the formula

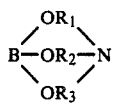

in which $R_1$, $R_2$ and $R_3$ are straight chain or branched alkylene groups having 2 to 5 carbon atoms and $R_1$, $R_2$ and $R_3$ may be the same or different, said ester being introduced in an amount of from about 1% to 200% by weight of said polymer, said ester being slowly hydrolyzable to produce boric acid which is converted to borate ions at conditions in said thief zone, whereby said borate ions cause crosslinking of said polymer to form a gel which reduces the flow of injected water into said thief zone.

6. The process of claim 5 in which a base for converting boric acid to borate ions is also introduced into said thief zone.

7. The process of claim 5 in which the water soluble polymer and the alkoxy amine ester of boric acid are separately introduced into said thief zone.

8. The process of claim 5 in which the water soluble polymer and the alkoxy amine ester of boric acid are combined prior to their introduction into said thief zone.

9. The process of claim 8 in which the water soluble polymer is polyvinyl alcohol and the alkoxy amine ester of boric acid is tripropanol amine borate.

10. A time-delayed gelling composition comprising:
(a) a solution of a water soluble polymer selected from the group consisting of polygalactomannan gums, hydroxyalkyl ethers of polygalactomannan gums, carboxy alkyl ethers of polygalactomannan gums, their depolymerized counterparts, polyvinyl alcohol and mixtures thereof, said polymer being in said solution in an amount of from about 1% to 10% by weight of said solution; and
(b) a slowly hydrolyzable alkoxy amine ester having the formula

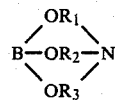

in which $R_1$, $R_2$ and $R_3$ are straight chain or branched alkylene groups having 2 to 5 carbon atoms and $R_1$, $R_2$ and $R_3$ may be the same or different, said ester being present in an amount of from about 1% to 200% by weight of said polymer.

11. The composition of claim 10 further comprising an added base material in an amount sufficient to convert boric acid formed by hydrolysis of said ester to borate ions.

12. The composition of claim 11 in which the water soluble polymer is polyvinyl alcohol, the alkoxy amine ester of boric acid is tripropanol amine borate and the base is sodium hydroxide.

* * * * *